United States Patent Office 3,509,219
Patented Apr. 28, 1970

3,509,219
PROCESS FOR PREPARING MERCAPTO-TRITHIOMETHYLENE
Janine Ourgaud, Paris, and Bernard Audouze, Orthez, France, assignors to Société Nationale des Petroles d'Aquitaine Tour Aquitaine, Courbevoie, France
No Drawing. Filed Oct. 12, 1966, Ser. No. 586,038
Claims priority, application France, Oct. 26, 1965, 36,187
Int. Cl. C07c *149/06*
U.S. Cl. 260—609                    9 Claims

ABSTRACT OF THE DISCLOSURE

A process for preparing substantially pure mercapto-trithiomethylene of the formula $HS(CH_2S)_3H$ is provided wherein formaldehyde is introduced into an aqueous hydrogen sulfide solution, the concentration of the hydrogen sulfide in the solution is controlled to provide at all times the presence in the solution of at least one mol of hydrogen sulfide per mol of formaldehyde, the temperature of the solution is maintained between 0° and 60° C. until a liquid oily layer is formed and the oily layer is then recovered. Mercapto-trithiomethylene is useful in the preparation of organic sulphur compounds, particularly resins.

---

The present invention relates to a process for preparing mercapto-trithiomethylene, also known as mercapto-trithioformaldehyde, in a substantially pure state, free of other mercapto-polythiomethylenes; the invention also relates to the compound itself in the substantially pure state in which it corresponds to the formula $$HS(CH_2S)_3H$$

being uncontaminated by analogous compounds having a number of $CH_2S$-groups other than three.

It is known to prepare mercapto-polythiomethylenes of the general formula $HS(CH_2S)_nH$, also referred to as mercapto-polythioformaldehydes, by reacting hydrogen sulphide with formaldehyde; however, it has been hitherto possible to obtain one of these substances alone, to correspond to a predetermined integer $n$. The products so far obtained have always been constituted by mixtures of several homologues with different values of $n$, in most cases comprised between 1 and 20. Moreover, it is rather difficult to obtain these compounds free of oxygen. On the other hand, bearing in mind the usefulness of these mercapto-polythiomethylenes in the preparation of various organic sulphur compounds, particularly resins, it would be desirable in certain cases to be able to employ a substance containing a definite predetermined number of $CH_2S$ groups; in particular it would be desirable in certain cases to have available the tri-compound in the substantially pure state.

It has been proposed, hitherto, to obtain the aforementioned compounds by the action of $H_2S$ on an aqueous formaldehyde solution at various temperatures, generally within the range of from 0 to 100° C. Depending on the temperature and the pH of the reaction medium, the products are, in general, either water soluble substances or waxy or solid substances. The operating conditions which will enable such substances to be obtained are specified in, for example, French patent specifications Nos. 767,899 and 1,330,819, U.S. patent specification No. 1,991,765 and British patent specification No. 298,390. The preparation of these substances by the methods proposed in the prior art is often accompanied by the formation of solid cyclic compounds (trithiane). Eitherto, liquid products have been obtained by using an excess of liquid $H_2S$, which requires operation under pressure. However, even then the products obtained have a heterogenous chemical composition and contain methane-dithiol (see U.S. Patent No. 3,056,841). Liquid mercaptopolythiomethylenes which correspond better to the formula $HS(CH_2S)_nH$, can be obtained by final saturation of the waxy products of known processes with $H_2S$, by operating at temperatures between 70 and 90° C., according to French Patent No. 1,362,500. However, none of these processes allows one to obtain a specific product comprising the trithio compound alone, not accompanied by its homologues or by other thio-compounds.

A common feature of all the previously known processes, with the exception of the process operating under pressure with liquid $H_2S$, is that—at least at the outset— the reaction medium contains an excess of formaldehyde in relation to the hydrogen sulphide, that is to say, in general substantially more than one mol of HCHO per mol of $H_2S$. In fact, in all these processes a formaldehyde solution is used as starting material, having generally a concentration of 37 to 40% by weight into which a stream of hydrogen sulphide is passed. The $H_2S/HCHO$ ratio therefore varies, during the preparation, from zero to a value which finally may exceed 1, but which obviously remains below 1 during a major part of the reaction.

The present invention is based on the observation that, surprisingly, the ratio of the concentrations of $H_2S$ and HCHO in the medium exerts a considerable influence on the composition and nature of the thiocompounds formed. In fact, it has been found possible to prepare pure mercapto-trithiomethylene economically and under atmospheric pressure by taking care that the reaction solution does not contain more than one mol of HCHO per mol of $H_2S$ at any instant.

Accordingly, the process according to the invention consists in introducing formaldehyde into an aqueous hydrogen sulphide solution, containing at all times at least one mol of $H_2S$ per mol of HCHO introduced.

When carrying out the new process, the molar ratio $H_2S/HCHO$ may be varied at will, that is to say from the value 1 to very high values, almost without limit. From the practical point of view, the most favourable ratios are comprised between 1 and 4, and more especially between 1.2 and 1.5.

Another important condition for obtaining the compound $HS(CH_2S)_3H$ in the pure state is the maintaining of a suitable temperature, in particular within the range of from 0 to 60° C., and preferably between 10 and 50° C. It has been observed that within these temperature limits, with the above specified $H_2S/HCHO$ ratios, the product obtained is entirely liquid, while from 60° C. onwards, the liquid is accompanied by varying quantities of solid or waxy material of different composition, which reduce the yield of the desired trithio-compound.

In the method of preparation according to the invention, the pH of the reaction medium is also of importance. Since an acid medium generally accelerates the reaction, it is advantageous to operate at a relatively low pH, but the acidity must not be excessively high, because this would lead to the formation of solid compounds which do not correspond to the desired trithio-product. In general, the pH of the solution should be between 1 and 6.8, and preferably between 1.2 and 3.8.

Whilst observing the above-specified factors of relative concentration, temperature and pH, the process according to the invention can be carried out in various ways which will be apparent to those skilled in the art. A highly practical and advantageous method consists in preparing first of all an aqueous solution saturated with $H_2S$ at atmospheric pressure, or if desired at a higher pressure, and adding thereto progressively and with stirring a formaldehyde solution, while passing a stream of $H_2S$ into the solution and taking care that during the whole of the operation the solution contains at least one mol of $H_2S$ for each mol of HCHO.

The reaction rate and thus the time required for the total conversion of the formaldehyde into the trithio-compound vary with the temperature, the latter being generally of the order of from 4 to 24 hours. At the end of this period, the liquid layer formed at the bottom of the solution is separated by decanting; it is then evaporated at a temperature not exceeding 100° C. and the liquid thus obtained is practically pure $HS(CH_2S)_3H$. The aforesaid liquid layer can also be continuously withdrawn, if desired, and indeed the whole preparation can be carried out continuously.

The new substance provided by the present invention, which has never before been prepared in the pure state nor described, has the following properties:

Density at 20° C.—1.34
Molecular weight—172
Refractive index (20° C.)—1.6611
Sulphur content very nearly 74%
Freezing point below —20° C.
Boiling temperature under 0.35 mm. Hg: 77° C.

This product is stable at ambient temperature and does not undergo change during storage, but remains perfectly limpid. On the other hand, heating, and in particular distillation at atmospheric pressure without adequate precaution, lead to changes in the product, notably by decomposition and homopolymerisation.

Mercapto-trithiomethylene prepared in this way is insoluble in water but soluble in most of the conventional solvents, particularly in ether, benzene, carbon tetrachloride and alcohol.

Thus, the product according to the invention clearly differs from all polythioformaldehyde or mercaptotrithiomethylene preparations hitherto described.

The invention will be further described by reference to the following non-limitative examples. In all these examples, the method described above has been applied. The process was carried out using a round-bottomed flask of 2 litres capacity, equipped with a stirrer, a tube for introducing gaseous $H_2S$, a funnel for introducing the 37% aqueous formaldehyde solution and a thermometric sleeve. The flask was placed in a bath provided with a thermostat. At first, water was introduced into the flask and maintained therein at a predetermined temperature; the water was then saturated with a stream of $H_2S$. On reaching saturation, the formaldehyde solution was introduced gradually. The temperature was maintained constant during the entire length of the operation. The solution was stirred, while continuing with the introduction of $H_2S$ during the addition of formaldehyde.

The operating conditions are the same in all the following examples, so that only the proportions of the reactants, the pH and the temperatures employed have to be indicated.

EXAMPLE 1

1.5 litres of water was held at 30° C., saturated with 0.129 mol $H_2S$; 0.099 mol HCHO, i.e. ¾ of the quantity of $H_2S$, was added in the form of a 37% aqueous solution.

The pH of the medium was maintained between 3.7 and 3.9. $H_2S$ continued to be passed at a flow rate of 50 l./h.

Samples taken during the operation showed that 50% of the formaldehyde had been transformed after 1¾ hours, 75% after 4 hours and 80% after 5 hours.

The oily product collected displayed the properties indicated above.

EXAMPLE 2

Temperatures: 10° C.

The quantity of $H_2S$ dissolved in the water was 7.5 mols and the quantity of formaldehyde introduced was 5.7 mole, i.e. ¾ of the amount of $H_2S$.

pH of the medium: between 3.7 and 3.9.

Quantitative analysis indicated that 25% of the formaldehyde had been transformed after 4 hours and 30% after 6 hours.

The oil obtained displayed the same properties as in the previous example.

EXAMPLE 3

Temperature: 50° C.

$H_2S$ dissolved: 0.081 mol, formaldehyde added: 0.061 mol (i.e. ¾ of the $H_2S$).

pH: between 3.7 and 3.9.

Quantitative analysis indicated 50% formaldehyde conversion after 30 minutes, 75% after one hour, 90% after 2 hours and 98% after 5 hours. The oil decanted from the mixture had the same properties as previously.

EXAMPLE 4

Temperature: 30° C.

$H_2S$ dissolved: 0.129 mol, HCHO introduced: 0.129 mol.

$H_2S$ flow-rate during formaldehyde introductions: as above, i.e. 50 litres/hour.

pH: between 3.7 and 3.9.

50% of the HCHO was converted after 3 hours, 80% after 6¾ hours and 85% after 9 hours.

The oil decanted was identical to that of the previous example.

EXAMPLE 5

The operating conditions were the same as in Example 4, but 0.377 mol of formaldehyde was added, i.e. 3 mols for each mol of $H_2S$.

A delay in the start of the reaction was observed, in contrast to the instantaneous onset in the previous examples. The oil separating at the bottom of the flask was accompanied by a waxy substance.

EXAMPLE 6

The operating econditions were the same as in Example 4, but the amount of formaldehyde employed was 10 times that of the $H_2S$, i.e. 1.29 mols.

The onset of the reaction was delayed for an even longer period than in the case of Example 5.

Instead of an oil, a waxy mass was obtained.

EXAMPLE 7

The operating conditions were the same as in Example 1, but the pH was adjusted to between 1.2 and 1.5.

50% of the formaldehyde was converted after 45 minutes, 75% after 1 hour and 95% after 3½ hours. The reaction was thus considerably faster than with a pH between 3.7 and 3.9 as used in Example 1. The oil obtained was identical to that obtained in Example 1.

EXAMPLE 8

Operating under the same conditions as in Example 1, the pH was adjusted to between 0.7 and 1. Under these conditions, the oil was accompanied by a crystalline product, identified as a cyclic compound $(CH_2S)_3$.

EXAMPLE 9

When the method of Example 1 was carried out with the pH adjusted to between 0.5 and 0.7, solid trithiane was obtained without any liquid product.

EXAMPLE 10

Temperature: 60° C.

$H_2S$ dissolved: 0.074 mol; HCHO added: 0.055 mol, i.e. ¾ of the amount of $H_2S$.

The other conditions being the same as in Example 1, the resulting oil contained a waxy substance.

EXAMPLE 11

The preparation was carried out as in Example 10, but at a temperature of 80° C. No oil was formed, but only a waxy product.

EXAMPLE 12

The method of Example 7 was repeated using a quantity of formaldehyde ⅓ of that of $H_2S$. The liquid obtained was identical to that of Examples 1 to 4 and 7.

EXAMPLE 13

The preparation was carried out according to the same general method as in Example 1, but at a temperature of 40° C., with a pH in the region of 3.5, the molar ratio $HCHO/H_2S$ being 1/3. A liquid identical to that of Example 1 was obtained.

Some of the conclusions which can be drawn from the foregoing examples are listed in the following tables.

TABLE I

Temperature 30° C., pH 3.7 to 3.9

| Mol $HCHO/H_2S$ | Product obtained |
|---|---|
| 1/3 | Liquid $HS(CH_2S)_3H$. |
| 1/1 | Do. |
| 3/1 | Liquid plus waxy substance. |
| 10/1 | Waxy Substance. |

TABLE II.—REACTION RATE

| Temperature, ° C. | Reaction time (in hours) | | | |
|---|---|---|---|---|
| | ½ | 1¾ | 4¾ | 6 |
| | Percent formaldehyde converted | | | |
| Reaction: | | | | |
| 10 | | | | 30 |
| 20 | | | 50 | |
| 30 | | 50 | 78 | |
| 50 | 50 | 86 | 97 | 100 |

TABLE III

[Effect of Temperature]

pH 3.7 to 3.9          $HCHO/H_2S$ ratio: 3/4

| 10° C. | Liquid $HS(CH_2S)_3H$. |
|---|---|
| 30° C. | Do. |
| 50° C. | Do. |
| 60° C. | Liquid plus waxy substance. |
| 80° C. | Waxy substance alone. |

We claim:
1. A process for preparing substantially pure mercapto-trithiomethylene of the formula $HS(CH_2S)_3H$, comprising introducing formaldehyde into an aqueous hydrogen sulfide solution, controlling the concentration of hydrogen sulfide in the solution to provide at all times the presence in the solution of at least one mol of hydrogen sulfide per mol of formaldehyde, controlling the pH of the solution to maintain the pH between 1 and 6.8 and controlling the temperature of the solution to maintain a temperature of between 0° and 60° C. until a liquid oily layer is formed and recovering the oily layer.

2. The process of claim 1 wherein a saturated aqueous solution of hydrogen sulfide is prepared, formaldehyde is progressively introduced into the solution with stirring and a stream of hydrogen sulfide is introduced into the solution in order to provide at all times the presence in the solution of at least one mol of hydrogen sulfide per mol of formaldehyde.

3. The process of claim 1 wherein the process is carried out discontinuously and is effected in from 4 to 24 hours.

4. The process of claim 1 wherein the solution is maintained at a temperature of between 10° and 50° C. until the liquid oily layer is formed.

5. The process of claim 4 wherein the pH of the solution is controlled to maintain the pH between 1.2 and 3.9.

6. The process of claim 5 wherein the process is carried out continuously and the oily layer is continuously recovered.

7. The process of claim 5 wherein the process is carried out continuously and the oily layer is recovered intermittently.

8. The process of claim 1 wherein the concentration of hydrogen sulfide in the solution is controlled to provide at all times the presence in the solution of between 1 and 4 mols of hydrogen sulfide per mol of formaldehyde.

9. The process of claim 8 wherein between 1.2 and 1.5 mols of hydrogen sulfide are provided at all times in the solution per mol of formaldehyde.

References Cited

UNITED STATES PATENTS

| 1,991,765 | 2/1935 | Marks | 260—17 |
| 3,056,841 | 10/1962 | Saegebarth | 260—609 |
| 3,326,982 | 6/1967 | Bapseres | 260—609 |

CHARLES B. PARKER, Primary Examiner

D. R. PHILLIPS, Assistant Examiner